(12) United States Patent
Aull

(10) Patent No.: US 6,650,243 B2
(45) Date of Patent: Nov. 18, 2003

(54) PET AFFECTION INDICATOR

(76) Inventor: Richard J. Aull, 35 E. 34th St., Reading, PA (US) 19606

( * ) Notice: Subject to any disclaimer, the term of this patent is extended or adjusted under 35 U.S.C. 154(b) by 140 days.

(21) Appl. No.: 10/010,658

(22) Filed: Dec. 6, 2001

(65) Prior Publication Data

US 2002/0109599 A1 Aug. 15, 2002

Related U.S. Application Data

(60) Provisional application No. 60/254,089, filed on Dec. 8, 2000.

(51) Int. Cl.$^7$ ................................................ G08B 23/00
(52) U.S. Cl. .................................. 340/573.3; 340/573.1
(58) Field of Search ........................... 340/573.1, 573.3, 340/309.16, 309.4, 691.6; 119/859, 856, 857, 858, 908; 73/493

(56) References Cited

U.S. PATENT DOCUMENTS

| | | |
|---|---|---|
| 4,785,433 A | 11/1988 | Bush et al. |
| 4,876,674 A | 10/1989 | Parmely et al. |
| 5,454,350 A | 10/1995 | Betheil |
| 5,952,925 A | 9/1999 | Secker |
| 5,955,953 A * | 9/1999 | Hanson et al. ........... 340/573.3 |
| 5,966,526 A | 10/1999 | Yokoi |
| 6,003,473 A | 12/1999 | Printz |
| 6,104,294 A | 8/2000 | Andersson et al. |
| 6,369,698 B1 * | 4/2002 | Valente .................. 340/309.15 |
| 6,502,060 B1 * | 12/2002 | Christian .................... 702/178 |

* cited by examiner

*Primary Examiner*—Anh La
(74) *Attorney, Agent, or Firm*—Akin, Guma Strauss, Hauer & Feld, L.L.P.

(57) ABSTRACT

A pet affection indicator device presents information regarding the quantity of affection a pet owner is giving to the pet. The device includes a sensing assembly with a sensor element worn by a pet, and produces signals based on sensing of a human's touching of the pet near the sensor element. A processor receives the signals from the sensing element and calculates data associated with at least one of an amount, frequency and duration of the sensed touching and elapsed time since the last of the sensed touching. A memory is in electrical communication with the processor for storing the data. The device also includes an indicator that communicates to a human an indication associated with the data based on the touches. With this device, the pet owner, by paying attention to the indicator, will know if and when the pet is due for more affection.

27 Claims, 5 Drawing Sheets

PET AFFECTION INDICATOR

CROSS-REFERENCE TO RELATED APPLICATIONS

This application claims the benefit of U.S. Provisional Patent Application No. 60/254,089, filed Dec. 8, 2000.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

The present invention relates to a pet affection indicator device so that a human can receive input indicating the amount, frequency and duration of contact and time since last contact of the pet by the human. With this invention, both the pet and the human contacting the pet, typically by petting, can have their mutual need for regular tactile interaction satisfied.

It is well known how pets benefit humans (such humans will hereinafter be referred to as the pet owners, although it should be clear that such term refers to any person favorably relating to a pet), by the pet's ability to calm the pet owner, lower the pet owner's blood pressure, heart rate and in general soothe and calm the owner. According to the book, *Between Pets and People*, by Alan Beck & Aaron Katcher, "Touching reduces stress and combined with gentle talk creates a feeling of intimacy, closeness, completion." A study on the effect of pets on people by Erika Friedman carried out at the University of Maryland from 1977 to 1979 demonstrated the linkage between surviving heart disease and owning a pet. Her conclusion was that the mortality rate among people with pets was one third that of patients without pets. Another study indicated that having a pet improved a patient's chances of surviving severe heart disease and helped the patient to be healthier. In fact the study showed that having a pet could decrease the probability of dying by about 3%. With more than one million people dying of heart disease every year, having and caressing a pet can result in a savings of thirty thousand lives.

It is also well know that most common pets derive pleasure by the touch and caresses given to them by their owners. The owner's touch provides a soothing and calming affect on the pet's demeanor as well, as any pet owner can testify after an absence from the pet.

BRIEF SUMMARY OF THE INVENTION

The present invention relates to a pet affection indicator device comprising a sensing assembly including sensor circuitry and at least one sensor element worn by a pet, the sensing assembly producing signals representative of sensing of a human's touching of the pet in an effective range of the sensor element; the sensor element being in electrical communication with a processor that receives the signals from the sensing element and calculates data associated with at least one of an amount, frequency, duration of the sensed touching and elapsed time since the last of the sensed touching; memory in electrical communication with the processor for storing the data associated with at least one of the amount, frequency, duration of the sensed touching and elapsed time since the last of the sensed touching; and an indicator in communication with the processor that communicates to a human an indication associated with at least one of the amount, frequency, duration of the sensed touching and elapsed time since the last of the sensed touching.

The processor could be programmed to indicate visually or aurally, or both, the amount of affection received based upon the sensing data inputted, thus indicating to the pet owner a degree of satisfaction (the owner's satisfaction or the pet's satisfaction as perceived by the owner). Alternatively or additionally, the computer could be programmed such that the readout device or other indicator provides a visual and/or aural indication that a pre-programmed amount, duration or frequency of petting has not occurred, so that the pet owner would likely provide more petting, enhancing the satisfaction of both the pet and the pet owner.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings.

DETAILED DESCRIPTION OF THE INVENTION

Figure 1:
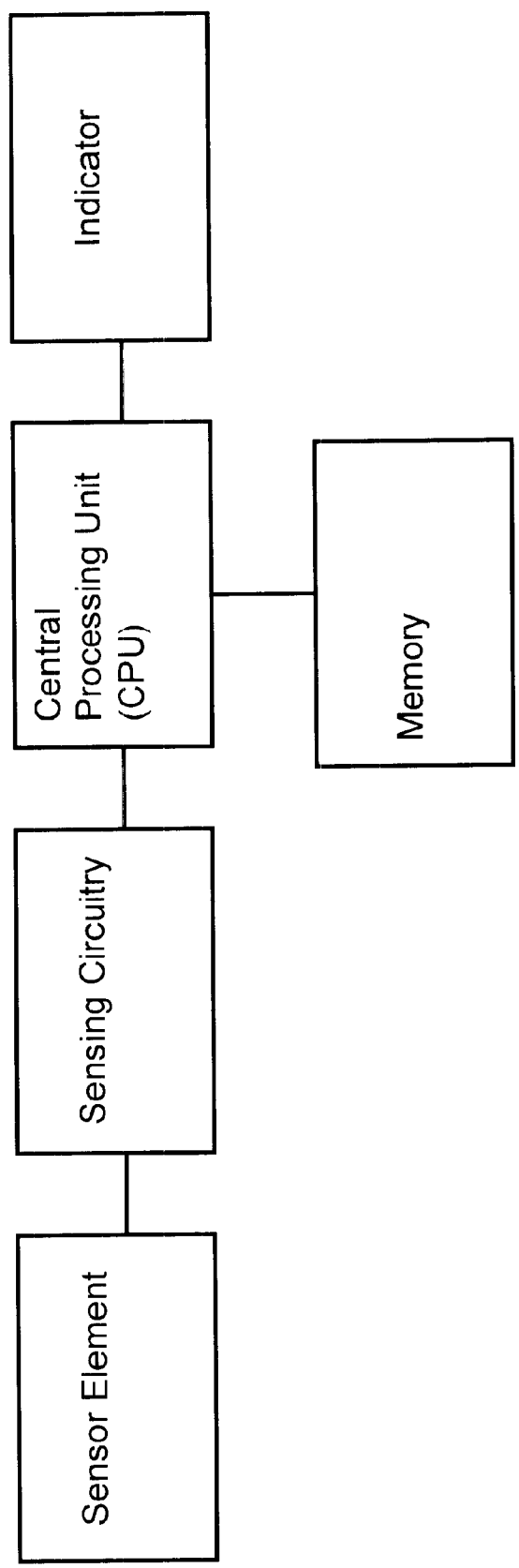
FIG. 1 is a schematic representation in the form of a block diagram of the operative components of the invention.

Referring to the drawings, wherein like numerals refer to like elements throughout the several views, there is shown in FIG. 1 a schematic representation of the components of a device for sensing and indicating the amount of affection given to a pet. In one preferred embodiment, the pet affection indicator device comprises functionally interconnected components comprising a sensing assembly, a processor and memory unit, and an indicator to indicate information sensed by the sensing device. The sensing assembly that includes a sensor element and sensing circuitry. The sensor element in conjunction with the sensing circuitry generates an electrical signal representative of a touch of or near the sensor element. The sensing circuitry is in electrical communication with a processor, such as a central processing unit (CPU) of a microcomputer, that receives the signals from the sensing circuitry and calculates data associated with at least one of the amount, frequency and duration of the sensed touching, or the elapsed time since the last sensed touching. The data are stored in a computer memory device. An indicator is in electrical communication, directly or remotely, with an indicator for indicating at least one of the amount, frequency and duration of the sensed touching, or the elapsed time since the last sensed touching. These components are functionally connected together to achieve the results disclosed herein.

It is preferred that the device, by means of the processor, the memory and the indicator, indicates the amount of sensed touching over a predetermined time period. The predetermined time period is preferably adjustable by the pet owner or other user of the device. Additionally, it is preferred that the device functions to indicate the amount of sensed touching over a predetermined time period and the elapsed time since a predetermined accumulated amount of the last sensed touching. As before, the predetermined time period, the elapsed time and the predetermined amount of accumulated touching are preferably adjustable by the pet owner or other user. As noted above, alternatively or additionally, the processor could be programmed to indicate that a predetermined amount, duration or frequency of petting has not occurred.

Figure 2:
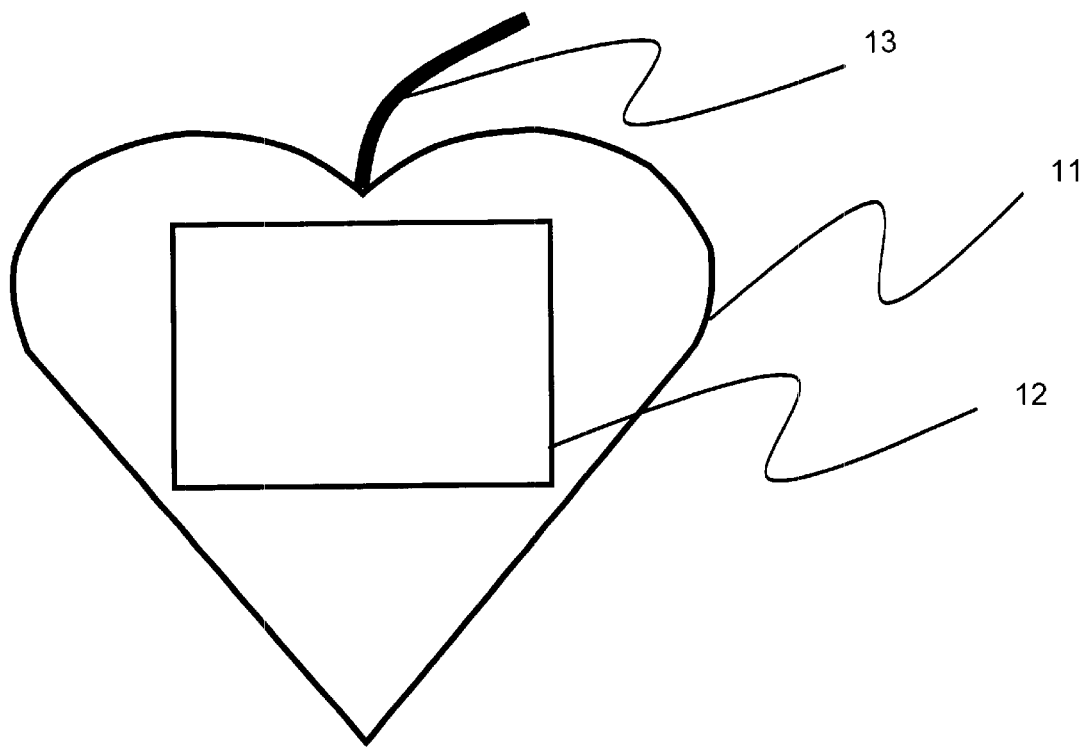
FIG. 2 is a representation, in a front elevation view, of a preferred shape and configuration of a housing that may contain the sensing circuitry, processor, computer memory device and an indicator according to an embodiment of the invention.

As best seen in FIG. 2, one example of a physical embodiment of the components of the device, the sensor circuitry, the processor, the memory unit and the indicator are within a housing 11 that may be connected directly to or hang from a pet's collar or a harness in the form of a pendant, such as a heart-shaped pendant, as illustrated. Of course, the housing can have any other desired shape. It is preferred that the housing 11 be of such a size and shape that it can be carried easily by the pet by being mounted directly on or hanging from the pet's collar or harness. The housing is of compact design, and made of a durable material, such as, for example, a polymeric plastic material, for instance acrylonitrile-butadiene-styrene (ABS), polycarbonate or polystyrene, or metal, such as stainless steel, various types of durable and light aluminum alloys. The housing can be formed of two halves joined together by any suitable type or means of fastening, such as machined or unitarily molded hooks and slots, by screws or other mechanical clips, or by an adhesive. It is preferred that the halves be removably attached to allow ready access to the components inside the housing.

The front half preferably contains a visual display 12, preferably in the form of a an electronic visual screen. The visual display 12 indicates at a glance, alphanumerically (which means as used herein alphabetic characters, numeric characters or both), or by other graphic symbols, the quantity of affection a pet has been given over a given period of time as detected by touches sensed by the sensor element of the sensing assembly. The display 12 should be of a size that can be seen readily by the pet owner. While the indicator is preferably a visual display readout device worn by the pet, it could be in the form of a visual readout device remote from the pet or an audible indicator device worn by or remote from the pet. When the indicator is remote from the pet and the housing, the device may include a sending unit for sending signals relating to the data calculated by the processor and/or stored by the memory unit, and a receiver for receiving such signals. The receiver would have circuitry to convert the signals to one or more indications of the type described above relating to the degree and frequency of affection supplied to the pet. Suitable remote sending and receiving devices are well known to those skilled in the art of remotely controlling electronic devices, such as televisions, video cassette recorders, compact disc players and recorders, digital video disc players and recorders, and other audio and visual electronic equipment. An example of one suitable type of remote communication equipment is equipment using infrared signals. A sender or transmitter on the pet's collar or harness sends appropriate infrared signals to a receiver, resulting in display of the affection provided on a video monitor, such as a television. Another example of remote communication is by way of radio waves such as used in remote automobile door locking devices or garage door openers, which allow greater range and communication through barriers, because line-of-sight is not required between transmitter and receiver.

The back half of the housing 11 may be blank or can have a pet identification tag mounted thereto. One or more batteries, in contact with electrical contacts for powering the electronic components, can be and preferably are contained in the housing. Access to the batteries for replacement purposes is preferably through a removable cover in the back half of the housing.

Figure 3:
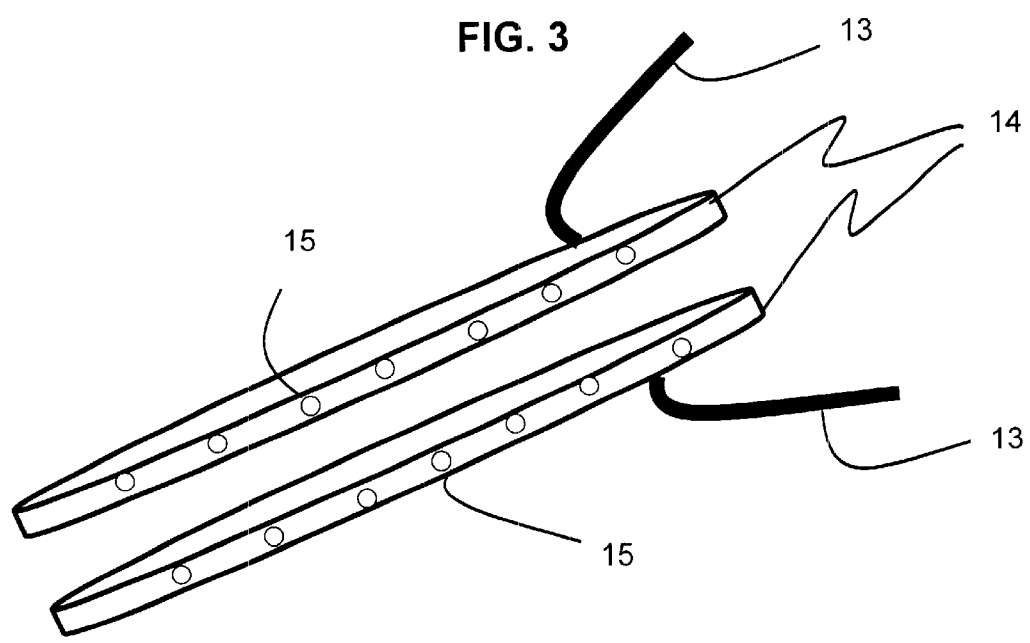
FIG. 3 illustrates one embodiment of a sensor element that is functionally connectable to a sensing means for sensing touches or near touches of the pet by the pet owner.

The sensing assembly may operate on the principle of capacitance or induction or other proximity sensing technology. The sensing assembly detects the number of times one or more sensor elements are touched, in the case of a capacitance sensor, or the number of near touches in the case of an inductive or other proximity sensor. The sensing assembly includes sensing circuitry preferably located in the housing 11, which is electrically connected by conductive wires or cables 13, as shown in FIGS. 2 and 3, to and one or more sensor elements, that may be in the form of a pair of sensor elements 14, shown in FIG. 3. In a preferred embodiment, the sensor elements 14 are a pair of wire strands or braids or other flexible, electrically conductive material incorporated within a collar or harness, sized suitably for a dog, cat or other pet. Rivets or studs 15 may be electrically connected to the sensor elements to allow greater sensitivity between the petting hand and the sensor elements. The sensor elements can be any touch-sensitive or near-touch sensitive material, in electrical communication with a device that generates a signal upon sensing the proximity of a petting hand.

The sensing assembly may include a capacitive proximity sensor that works by the concept of charge sensing. Capacitive proximity sensors, including various sensor elements and well-known sensing circuitry, are not new devices and have been available for industrial and commercial applications for many years. In brief, a capacitive proximity sensor works by sensing the change in charge of a reference capacitor when a sensing capacitor receives a small charge, such as when a person comes close to the sensing capacitor (thus completing the capacitive circuit loop). One preferred sensor employed in the current invention is the QT-110™ charge-transfer touch sensor, manufactured by Quantum Research Group, Southhampton, England, which contains all necessary integrated circuitry and a signal-processing algorithm to allow for accurate sensing. Other commercially available devices are readily available.

For the capacitive sensor to detect human contact (e.g. a stroking hand), grounding of the person is not required. The human body naturally has several hundred picofarads of capacitance to the local environment. The sense electrode 4 creates a "virtual capacitive ground." Thus, the proximity of the stroking hand is sensed by the sensor elements and the signal generated is transmitted to the processor or CPU via the sensing circuitry.

The CPU contains the logic that interprets the signals representing the number of touches as a numerical value stored in the CPU memory. Typically, memory devices include locations that are commonly called "registers." Since the register of the memory device collects the number of petting touches, the register will be referred to as the "pet accumulation register" or as its acronym "PAR." A timer circuit within the CPU will cycle through its logic at a predetermined frequency (it has been determined that about 1 second to about 10 seconds is preferred, and about 5 seconds is more preferred) to check the numerical value contained within the PAR. Every time the sensing assembly sends a signal to the CPU, the numerical value of the PAR increases or is "incremented." At every timer cycle when there is no new signal sent and after a predetermined time that preferably can be adjusted by the user, the numerical value of the PAR is decreased or "decremented." The functional reason for this logic is that the effect of touching a pet "wears off" after a given amount of time. The indicator's display 12 is refreshed at every timer cycle to provide the preferred visual, and more preferably graphic symbol, associated with the value in the PAR. As shown in the Graphics 1–6 of FIG. 4, the graphic symbol may be in the form of a developing heart symbol, from almost indiscernible in Graphic 1, associated with a few sensed touches, to fully formed in Graphic 6, after extensive touching is sensed. Any other graphic symbol or alphanumeric characters could also or alternatively be used. The values of increment and decrement will be preset for a "normal" amount of affection, but the pet owner will be able to adjust these values to suit the individual pet's and pet owner's affection requirements.

Figure 4:
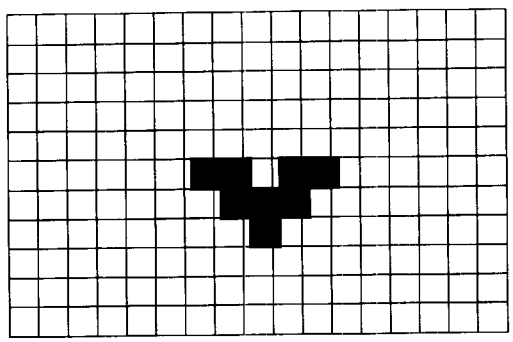
FIG. 4 illustrates an exemplary indicator in the form of a visual graphic display. No touches would be indicated by a blank display and is not shown. Graphic 1 indicates the first level showing minimal touches, and Graphics 2–6 respectively indicate five additional levels of touching of the pet by the pet owner, according to one preferred embodiment of the invention.
Figure 4:
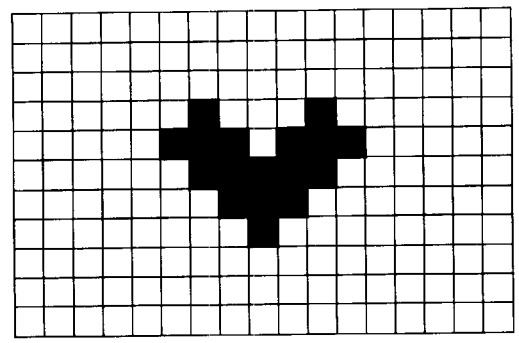
Figure 4:
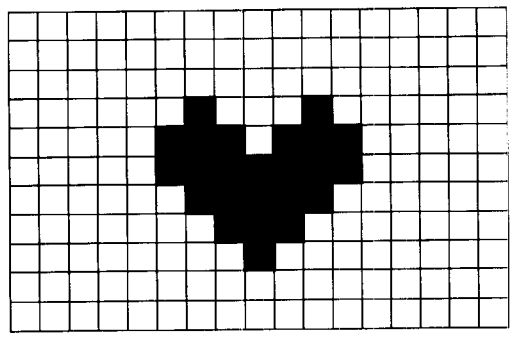
Figure 4:
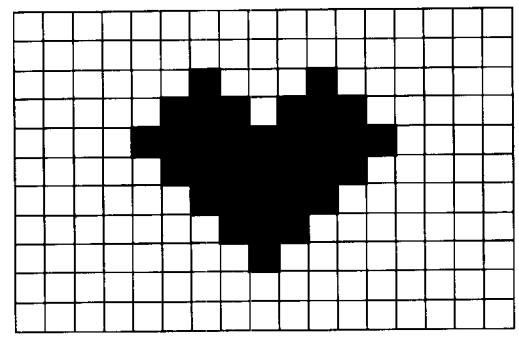
Figure 4:
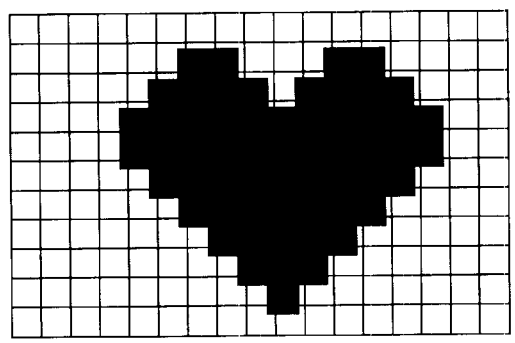
Figure 4:
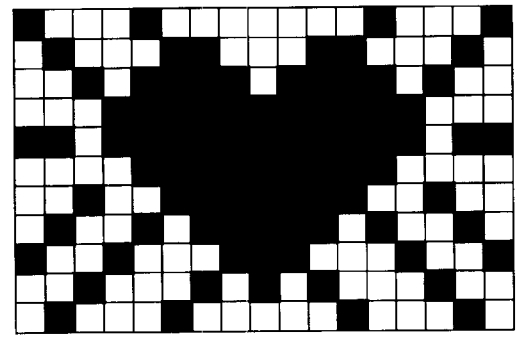
Figure 5A:
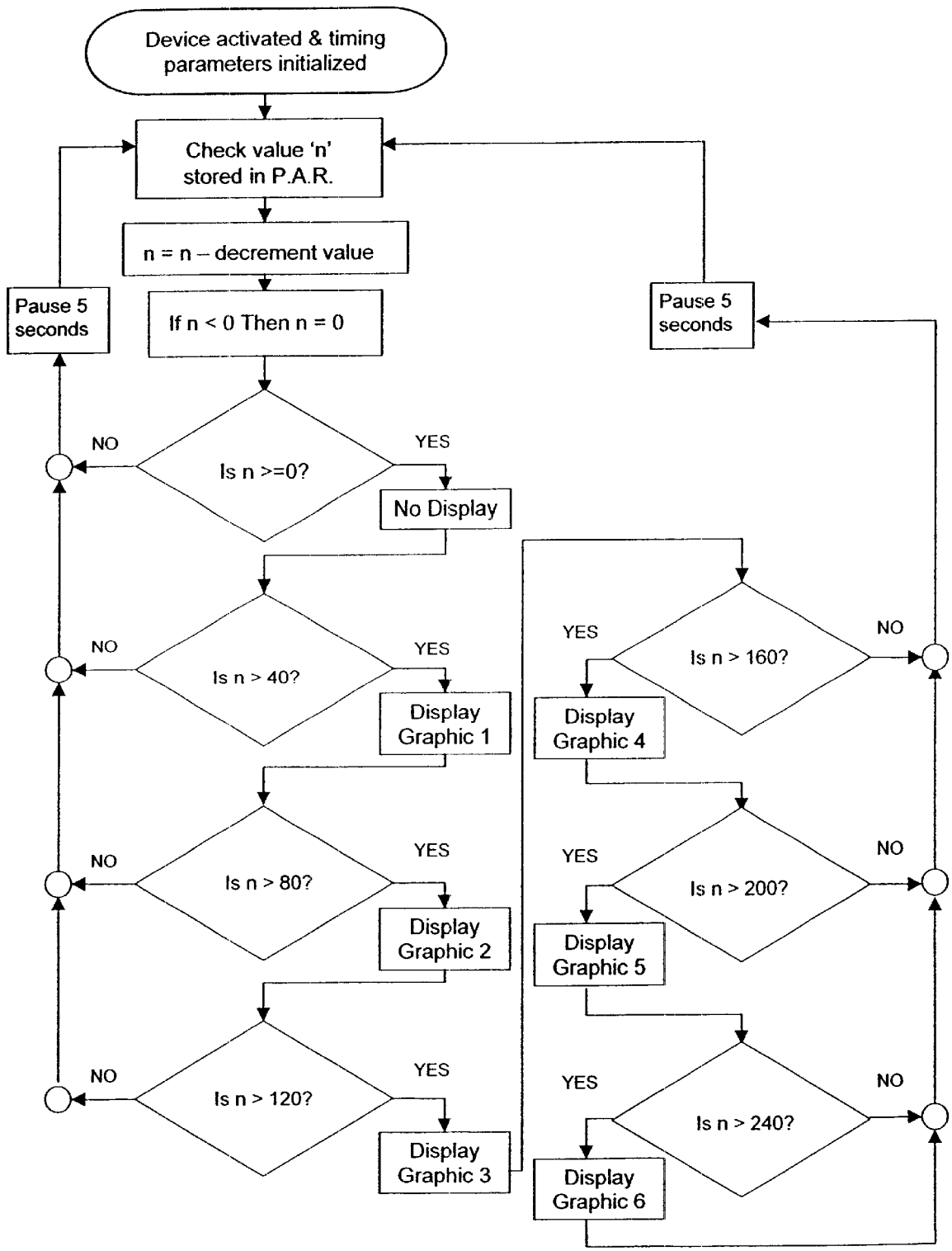
FIG. 5 comprises FIGS. 5A–5C, and is a logic flow diagram based on the algorithm that is used by the device to control the visual graphic display indicator of a preferred embodiment of the invention.
Figure 5B:
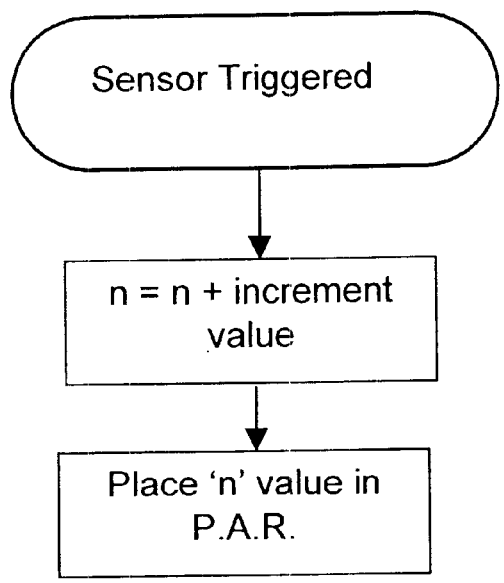
Figure 5C:
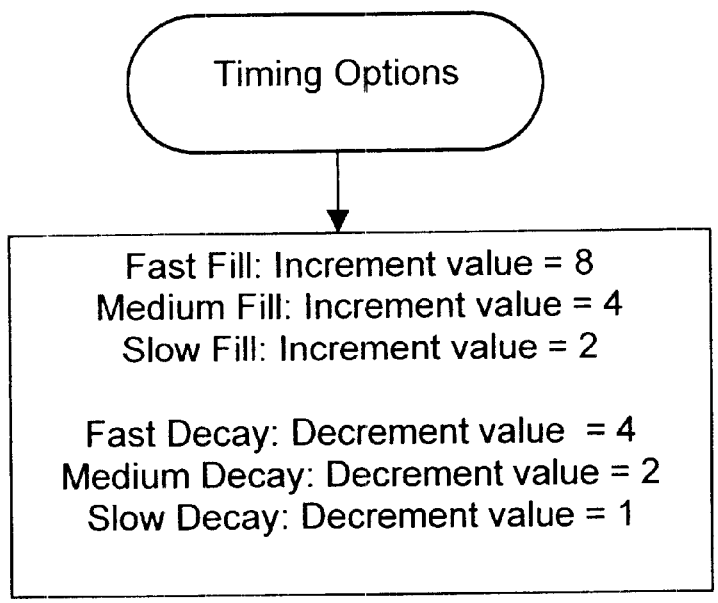

FIG. 5, comprising FIGS. 5A–5C, illustrates an exemplary preferred embodiment of a logic flow diagram signifying the algorithm that determines the output state of the readout display 2. The display of the readout device of FIG. 4 indicates this state by displaying a heart shaped figure corresponding to the accumulated value of pulses in the PAR. The display used as one example that is illustrated in FIG. 4 and as shown in FIG. 5 has six distinct graphics that correspond to six predetermined set points of the value contained in the PAR. Any other number of indicator steps or values in the PAR could be programmed into the processor, but six has been chosen in this example, since this number strikes a good balance between not enough and too much sampling and feedback.

What follows is a detailed description of the logic flow of the device in operation, with reference to the logic flow diagrams in FIGS. 5A–5C. Once the device is activated (switched on), the rate parameters are initialized and can be adjusted by the user to change the rate of filling the PAR (the time to show the largest display) and the rate of decay of the PAR (the time to reduce the largest display to a blank screen). Exemplary choices for increment and decrement are shown in FIG. 5C and are preset to values that correspond to the following time tables based on a cycle time of 5 seconds (other cycle times may be used and would result in proportionately different fill and decay rates):

| Increment Rate | Increment Value | Time to Fill (min.) |
|---|---|---|
| Fast | 8 | 2.5 |
| Medium | 4 | 5 |
| Slow | 2 | 10 |

-continued

| Decrement Rate | Decrement Value | Time to Decay (min.) |
|---|---|---|
| Fast | 4 | 5 |
| Medium | 2 | 10 |
| Slow | 1 | 20 |

In operation, the PAR will fill based on the number of touches or near touches sensed, multiplied by the increment value selected, and the value in the PAR will determine which heart shaped graphic or additional or other alphanumeric or different graphic is shown on the display. Also the PAR will diminish (decay) by the value associated with the option selected. Likewise, different sounds can be programmed to represent different aural indications relating to the affection provided to the pet by way of sensed touchings. The visual display of FIG. 4 is based on the logic presented in FIG. 5A, where "n" represents the numerical value stored in the PAR and is compared against the predetermined set points as shown in the following table:

| PAR (n) Value | Graphic Displayed |
|---|---|
| 40 | 1 |
| 80 | 2 |
| 120 | 3 |
| 160 | 4 |
| 200 | 5 |
| 240 | 6 |

Values of "n" less than 40 show no graphic (blank screen) and values over 240 show heart shaped Graphic 6 as depicted in FIG. 4. These values are preselected to coincide with reasonable decay rates that depend on the cycle time used. Also, the values selected can represent a linear function (as shown here) or any other function or value which would allow the effective use of the device. The relationship between the time to decay (in minutes), the decrement value and cycle time (in seconds) is:

Time to Decay (min.)=240/Decrement value×cycle time (seconds)/60

The action of the pet owner touching or stroking the pet will cause the sensor elements to register a signal to the sensing circuitry and in turn cause the PAR to increment as indicated in the logic flow diagram shown in FIG. 5B. This action is fully independent of the polling of the PAR as shown in FIG. 5A.

By using the pet affection indicator device described herein, the indicator, preferably in the form of a visual display 12 will present information to the pet owner relative to the amount of affection the pet owner has provided to the pet in a given period of time. Thus, the pet owner, by reviewing the display of the readout device, will know quickly if the pet is due for more affection.

It will be appreciated by those skilled in the art in view of the present disclosure that changes could be made to the embodiments described above without departing from the broad inventive concept thereof. It is understood, therefore, that this invention is not limited to the particular embodiments disclosed, but it is intended to cover modifications within the spirit and scope of the present invention as set forth in the following claims.

We claim:

1. A pet affection indicator device comprising a sensing assembly including sensor circuitry and at least one sensor element worn by a pet, the sensing assembly producing signals representative of sensing of a human's touching of the pet in an effective range of the sensor element; the sensor element being in electrical communication with a processor that receives the signals from the sensing element and calculates data associated with at least one of an amount, frequency, duration of the sensed touching and elapsed time since the last of the sensed touching; memory in electrical communication with the processor for storing the data associated with at least one of the amount, frequency, duration of the sensed touching and elapsed time since the last of the sensed touching; and an indicator in communication with the processor that communicates to a human an indication associated with at least one of the amount, frequency, duration of the sensed touching and elapsed time since the last of the sensed touching.

2. The device of claim 1 wherein the processor calculates, the memory stores and the indicator indicates an amount of sensed touching over a predetermined time period.

3. The device of claim 1 wherein the processor calculates, the memory stores and the indicator indicates an amount of sensed touching over a predetermined time period and the elapsed time since a predetermined accumulated amount of the last sensed touching.

4. The device of claim 1 wherein the sensor element is a part of one of a pet collar and a pet harness.

5. The device of claim 4 wherein the sensor element is a part of a pet collar.

6. The device of claim 1 wherein the sensor circuitry, the processor, the memory and the indicator are within a housing worn by the pet.

7. The device of claim 6 wherein the housing is part of one of a pet collar and a pet harness.

8. The device of claim 7 wherein the housing is part of a pet collar.

9. The device of claim 6 wherein the housing is in the form of a pendant connected to one of a pet collar and a pet harness.

10. The device of claim 6 wherein the housing is in the form of a pendant connected to a pet collar.

11. The device of claim 1 wherein the indicator is an audible indicator.

12. The device of claim 1 wherein the indicator is a visual display.

13. The device of claim 12 wherein the visual display displays alphanumeric characters indicative of at least one of the amount, frequency, duration of the sensed touching and elapsed time since the last of the sensed touching.

14. The device of claim 13 wherein the visual display indicates an amount of sensed touching over a predetermined time period.

15. The device of claim 13 wherein the visual display indicates an amount of sensed touching over a predetermined time period and the elapsed time since a predetermined accumulated amount of the last sensed touching.

16. The device of claim 12 wherein the visual display displays graphics indicative of at least one of the amount, frequency, duration of the sensed touching and elapsed time since the last of the sensed touching.

17. The device of claim 16 wherein the visual display graphically indicates an amount of sensed touching over a predetermined time period.

18. The device of claim 16 wherein the visual display graphically indicates an amount of sensed touching over a predetermined time period and the elapsed time since a predetermined accumulated amount of the last sensed touching.

19. The device of claim 1 wherein the device further indicates a signal indicating that there has been no sensed touching after a predetermined time period.

20. The device of claim 19 wherein the signal is an audible signal.

21. The device of claim 19 wherein the signal is a visually displayed signal.

22. The device of claim 19 wherein the predetermined time period is adjustable by a user.

23. The device of claim 1 wherein the duration and the elapsed time since the last of the sensed touching are adjustable by a user.

24. The device of claim 2 wherein the predetermined time period is adjustable by a user.

25. The device of claim 3 wherein the predetermined time period and the elapsed time are adjustable by a user.

26. The device of claim 1 wherein the indicator is worn by the pet.

27. The device of claim 1 wherein the indicator is remote from the pet, the device further including a sending unit for sending signals relating to the data calculated by the processor to a receiver that receives the signals and converts the signals to an indication associated with at least one of the amount, frequency, duration of the sensed touching and elapsed time since the last of the sensed touching.

* * * * *